United States Patent [19]

Lum et al.

[11] Patent Number: 4,522,798
[45] Date of Patent: * Jun. 11, 1985

[54] HALOPHOSPHAZENE POLYMERS

[75] Inventors: Genevieve S. Lum; Hsueh M. Li; F. Alexander Pettigrew, all of Baton Rouge, La.

[73] Assignee: Ethyl Corporation, Richmond, Va.

[*] Notice: The portion of the term of this patent subsequent to Jun. 11, 2002 has been disclaimed.

[21] Appl. No.: 530,776

[22] Filed: Sep. 8, 1983

[51] Int. Cl.$^3$ ............................................. C01B 25/10
[52] U.S. Cl. .................................................... 423/300
[58] Field of Search ......................................... 423/300

[56] References Cited

U.S. PATENT DOCUMENTS 4,374,815  2/1983  Li ........................................ 423/300

FOREIGN PATENT DOCUMENTS 572951  3/1959  Canada .............................. 423/300

Primary Examiner—John Doll
Assistant Examiner—Wayne A. Langel
Attorney, Agent, or Firm—Donald L. Johnson; John F. Sieberth; Joseph D. Odenweller

[57] ABSTRACT

A mixture of compounds of the formulas:

$$[X-(PX_2=N)_n-PX_3]^+[R]^-$$

and $$X-(PX_2=N)_n-POX_2$$

wherein X is a halogen atom, R is X or $PX_6$ or both of them, and n is an integer, usually below about 15, is heated either with no other reactant or with a suitable phosphorus reactant such as $PX_5$; $PX_3+X_2$; $P+X_2$; or a mixture of two or more such phosphorus reactants so that a halophosphazene having a $-PX_3{}^+$ end group is formed as one of the co-products of the reaction. This co-product is a substance having the general formula $$[X-(PX_2=N)_n-PX_3]^+[R]^-$$

wherein X, R and n are as defined above. The other co-product is phosphoryl trihalide, $POX_3$. In a second stage the resultant reaction product is heated with at least a stoichiometric amount (preferably, an excess) of a nitrogen source (e.g., $NH_3$; $NH_4Cl$; etc.) so that hydrogen halide is evolved and halophosphazene polymer of a suitably high molecular weight is formed. By freeing the initial mixture of the $-POX_2$ end group, the polymer formed in the second stage has greater linearity (less cross-linking) and reduced gel-forming tendencies.

18 Claims, No Drawings

HALOPHOSPHAZENE POLYMERS

Technical Field

This invention relates to the production of linear phosphonitrilic halide polymers. More particularly this invention relates to an improved process for producing halophosphazene polymers from halophosphazene oligomers, and to processes for treating such oligomers to render them better suited for use in producing halophosphazene polymers.

BACKGROUND

The customary method for the preparation of linear phosphonitrilic chloride polymers involves ring-opening polymerization of phosphonitrilic chloride trimer. Although workable, this method suffers from the fact that for satisfactory results to be achieved, highly pure cyclic phosphonitrilic chloride trimer must be used as the monomer. Such material is difficult and expensive to prepare.

Heretofore some work has been devoted to forming phosphonitrilic chloride polymers from lower molecular weight phosphonitrilic chloride oligomers. For example in J. Chem. Soc. 1960, 2542-7, Lund et al report an experiment in which a linear phosphonitrilic chloride oligomer of the formula $(PNCl_2)_{11}PCl_{4.2}$ was heated with ammonium chloride in sym-tetrachloroethane under reflux. Polymerization occurred after 5.5 hours, at which time the amount of hydrogen chloride evolved corresponding to the composition $(PNCl_2)_{10.6}PCl_5$. The rubbery product was extracted with light petroleum giving a significant quantity of a dark oil containing 10.5 percent $PNCl_2$ trimer, the remainder of the oil consisting of cyclic polymers higher than the heptamer.

Moran in J. Inorg. Nucl. Chem. 30. 1405-13 (1968) investigated the thermal polymerization of the linear compound $[Cl-(PCl_2=N)_3-PCl_3]^+PCl_6^-$ in evacuated sealed tubes at 300° C. for 5 hours and at 350° C. for 5 hours. The phosphorus NMR spectrum of both samples indicated that polymers of other chain lengths were formed. The results in the 300° C. case suggested to Moran that polymerization to the longer chain length compound $[Cl-(PCl_2=N)_6-PCl_3]^+PCl_6^-$ probably occurred. The NMR spectrum of the sample heated at 350° C. indicated to Moran that polymers of both longer and shorter chain lengths were formed.

G. Allen et al in Polymer 11, 31-43 (1970) report attempts to prepare linear $PNCl_1$ polymer by reacting $PCl_5$ with ammonium chloride in ortho-dichlorobenzene, the ammonium chloride being introduced by stepwise addition to the reacton mixture. They were in hopes that the following reactions would occur:

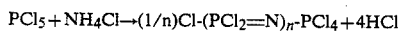

$PCl_5+NH_4Cl\rightarrow(1/n)Cl-(PCl_2=N)_n-PCl_4+4HCl$   (a)

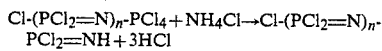

$Cl-(PCl_2=N)_n-PCl_4+NH_4Cl\rightarrow Cl-(PCl_2=N)_n-PCl_2=NH+3HCl$   (b)

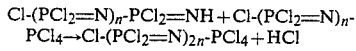

$Cl-(PCl_2=N)_n-PCl_2=NH+Cl-(PCl_2=N)_n-PCl_4\rightarrow Cl-(PCl_2=N)_{2n}-PCl_4+HCl$   (c)

However they obtained very low molecular weight polymer (intrinsic viscosity of trifluoroethoxy derivative was below 0.05 dL/g). When they tried to increase the molecular weight of the polymer product by reacting it with $NH_4Cl$ in o-dichlorobenzene solvent, they obtained a crosslinked material.

U.S. Pat. No. 3,443,913 discloses a method wherein linear $(PNCl_2)_{3-15}$ oligomers are heated at 240°-260° C. to produce linear phosphonitrilic chloride polymers having a molecular weight between 3,000 and 10,000. However, this process involves heating for long periods of time, the endpoint of the polymerization occurring about 40 to 60 hours after heating has been initiated. The product obtained via this process is reported to be a dark orange viscous oil. See also James M. Maselli, Thomas Bieniek and Rip G. Rice (W. R. Grace and Company), *Phosphonitrilic Laminating Resins,* Air Force Materials Laboratory, Technical Report AFML-65-314; Wright-Patterson Air Force Base, Ohio: June, 1965, pages 18-19, which describes this same process. At page 47 of this report Maselli et al describe an experiment wherein oligomeric phosphonitrilic chloride was placed in a resin kettle fitted with a nitrogen inlet, stirrer and exhaust tube condenser. The kettle was heated to $250°\pm10°$ C. for a total of 55 hours while the polymeric $(PNCl_2)_n$ was stirred under a blanket of dry nitrogen. Samples of the reaction material were taken at selected intervals of time during the heating for molecular weight determination. The resulting data were as follow:

| Time (Hours) | Molecular Weight (VPO) |
| --- | --- |
| Start | 700 |
| 10 | 1200 |
| 40 | 3200 |
| 55 | 6900 |

According to the authors, when heating was continued for an additional 8 hours at temperatures in excess of 250° C. the viscous, soluble oil (molecular weight 6900) was converted to the familiar insoluble "inorganic rubber".

In U.S. Pat. No. 3,545,942 which in part discloses a method of thermally stabilizing phosphonitrilic chloride oligomers by heating them in an inert atmosphere for 2 to 8 hours at 240° to 260° C., Rip G. Rice et al indicate that prolonged heating of the oligomer can result in the formation of an "inorganic rubber". A decade earlier Lund et al (op. cit.) referred to an experiment in which heating of a linear phosphonitrilic chloride oligomer in tetrachloroethane solution resulted in polymerization after 29 hours.

In prior applications Ser. No. 956,227 filed Oct. 30, 1978 and Ser. No. 176,926 filed Aug. 11, 1980, a distinctly superior thermal polymerization process is described wherein linear phosphonitrilic chloride oligomer is heated to 275° to 350° C. for 1 to 20 hours while concurrently withdrawing phosphorus pentachloride vapor from the liquid phase. A similar procedure is described in Japanese Laid-Open Application (Kokai) No. 55-27,344 published Feb. 27, 1980. In this case a linear phosphazene oligomer usually having a degree of polymerization of 3 to 15 is heated under reduced pressure (usually less than 20 mm Hg) to produce linear polymers. Heating for five hours or more at 100°-300° C. is suggested. Unfortunately, phosphorus pentachloride vapor is extremely corrosive at elevated temperatures—it tends to rapidly corrode even the most expensive corrosion-resistant metals used in the manufacture of corrosion-resistant chemical reactors.

Japanese Kokai No. 55-56,130 published Apr. 24, 1980 describes a method for producing phosphazene polymers in which a linear phosphazene oligomer is heated in the presence or absence of a solvent at 50° to 300° C. using a Lewis base such as urea, thiourea, polyurea or polythiourea as a catalyst for increasing molecular weight.

Japanese Kokai No. 55-56,129 published Apr. 24, 1980 discloses a process in which ammonium chloride is used as the catalyst in a reaction involving heating phosphazene oligomer at 150°-350° C. in a closed system. For example, a solution of linear and cyclic phosphonitrilic chloride oligomers in dichlorobenzene containing a small amount of ammonium chloride catalyst was heated at 255° C. for 10 hours in a sealed tube to form the polymer.

Japanese Kokai No. 55-25,475 published Jan. 23, 1980 describes formation of phosphazene polymers by reacting a phosphorus source (e.g., $P+Cl_2$; $PCl_3+Cl_2$; $PCl_5$) with a nitrogen source (e.g., $NH_3$; $NH_4Cl$) in any of three reaction systems:

(1) In a solvent that does not dissolve the phosphazene polymers, such as an aliphatic hydrocarbon or alicyclic hydrocarbon that is resistant to halogenation.

(2) In an undiluted (concentrated) reaction system having a small quantity (250 mL or less per mole of P source reactant) of a solvent capable of dissolving the phosphazene polymers that is resistant to halogenation, such as a halogenated aromatic hydrocarbon.

(3) In a phosphazene oligomer as the solvent.

Japanese Kokai No. 55-65,228 published May 16, 1980 describes a method for producing phosphazene polymers in which a mixture of linear phosphazene oligomer, which has bee stabilized with phosphorus pentachloride, hydrogen chloride or a metal halide, and cyclic phosphazene oligomer, is heated at 150° to 350° C. in a closed system having a solvent or non-solvent in the presence of a Lewis base catalyst. Urea, thiourea, polyurea, and polythiourea are examples of Lewis base catalysts used.

Japanese Kokai No. 55-50,027 published Apr. 11, 1980 discloses performing thermal ring-opening polymerization of cyclic phosphazene oligomers in the presence of linear phosphazenes stabilized with a metal halide, notably the linear oligomers formed as by-products when synthesizing the cyclic oligomers with metals or metal salts as catalysts. Such linear oligomers are indicated to have a degree of polymerization in the range of 2 to 100.

Japanese Kokai No. 55-60,528 published May 7, 1980 discloses a process wherein phosphazene polymers are formed by heating phosphazene oligomer at 150° to 350° C. in a closed system in the presence of a Lewis base such as urea, thiourea, polyurea or polythiourea. The phosphazene oligomer is a mixture of linear phosphazene oligomers (5 to 95 weight percent; stabilized with phosphorus pentahalide or hydrogen halide) and cyclic phosphazene oligomer.

Japanese Kokai No. 55-43,174 published Mar. 26, 1980 describes a process for producing phosphazene polymers in which cyclic phosphazene oligomers are subjected to thermal ring-opening polymerization in the presence of linear phosphazenes which have been stabilized by phosphorus pentahalides or hydrogen halides.

U.S. Pat. No. 4,374,815 describes a process wherein linear phosphonitrilic chloride polymers are produced from linear phosphonitrilic chloride oligomers by means of a two-step process. In the first step a mixture of linear phosphonitrilic chloride oligomer having an average degree of polymerization of at least four is heated with an excess of ammonia of ammonium chloride. Cyclic phosphonitrilic chloride oligomer formed during the course of the first step is removed from the reaction mixture. After the removal of the cyclic oligomer the reaction mixture is subjected to the second step which involves heating the mixture in an inert liquid solvent (optionally in the presence of ammonia or ammonium chloride) whereby the molecular weight of the linear phosphonitrilic chloride polymer is increased.

In copending application Ser. No. 447,720 filed Dec. 7, 1982, one of us (HML) describes an improvement in the process of U.S. Pat. No. 4,374,815 whereby the reaction rate when using ammonium chloride as the nitrogen source material in the first stage reaction is increased substantially by employing ammonium chloride having reduced particle size. For example, conversion of linear oligomer to linear polymer using ammonium chloride having a relatively small mean particle size of about 86 microns may be completed at a temperature of about 160° C. after about one hour. On the other hand, when ammonium chloride having a relatively large mean particle size of about 115 microns is used, the polymerization rate at the same reaction temperature is slower and the yield of desired product is lower. The mean particle size of the ammonium chloride is preferably within the range of about 1 micron to about 100 microns and most preferably within the range of about 1 micron to about 90 microns.

In copending application Ser. No. 487,804 filed Apr. 22, 1983, one of us (HML) describes a process whereby linear phosphonitrilic chloride polymers are produced from phosphonitrilic chloride oligomers by means of a two-stage process. In the first stage a mixture of phosphonitrilic chloride oligomers enriched in linear oligomer is heated with at least a stoichiometric amount (and preferably and excess) of ammonia or ammonium chloride while concurrently removing hydrogen chloride to produce an intermediate reaction product. In the second stage the molecular weight of the reaction product is increased by heating the product to a higher temperature than the average temperature used in the first stage. Cyclic phosphonitrilic chloride oligomer may be present in the initial oligomer. Preferably, cyclic phosphonitrilic chloride oligomer is recovered from the reaction mixture after the start of the second stage. Most preferably it is recovered after completion of the second stage. At least a portion of the recovered cyclic oligomer may be used in a subsequent first stage reaction.

In copending application Ser. No. 487,805 filed Apr. 22, 1983, one of us (HML) describes a process whereby linear phosphonitrilic chloride polymers are produced from phosphonitrilic chloride oligomers by means of an improved process wherein a mixture of phosphonitrilic chloride oligomers enriched in linear oligomer is heated with at least a stoichiometric amount (and preferably an excess) of ammonia or ammonium chloride while concurrently removing hydrogen chloride to produce a higher molecular weight polyphosphonitrilic chloride product. Cyclic phosphonitrilic chloride oligomer may be and preferably is present in the initial oligomer. Preferably, cyclic phosphonitrilic chloride oligomer is recovered from the reaction mixture during (but more preferably after) completion of the polymerization reaction. At least a portion of the recovered cyclic oligomer may be used in a subsequent polymerization reaction.

In copending application Ser. No. 489,414 filed Apr. 28, 1983, one of us (HML) describes a process whereby halophosphazene polymers such a linear phosphonitrilic chlorie polymers are prepared in two stages by (i) heating a nitrogen source (e.g., NH₃; NH₄Cl; etc.) with an excess of a phosphorus source (e.g., PCl₅; PCl₃+Cl₂; P+Cl₂; etc.) so that hydrogen halide is evolved and halophosphazene is formed, and (ii) heating at least a portion of the halophosphazene with at least a stoichiometric amount (preferably an excess) of a nitrogen source (e.g., NH₃; NH₄Cl; etc.) so that hydrogen halide is evolved and halophosphazene polymer of higher molecular weight is formed. Preferably, a third stage is utilized wherein the resultant halophosphazene polymer is then heated, most preferably in an inert solvent or diluent which enhances the fluidity of the reaction mixture, to increase the molecular weight of the polymer.

SUMMARY OF THE INVENTION

This invention involves the discovery that when preparing halophosphazene of lower molecular weight such as linear phosphonitrilic chloride oligomer by reaction between a phosphorus source (e.g., PCl₅; PCl₃+Cl₂; P+Cl₂; etc.) with a nitrogen source (e.g., NH₃; NH₄Cl; etc.) an oxygenated impurity is often present in the oligomeric product. Based on $^{31}$P NMR analysis, this impurity has been identified as an oligomer having a —POX₂ end group, this oligomer contaminant having the general formula:

$$X\text{-}(PX_2=N)_n\text{-}POX_2$$

wherein X is a halogen atom and n is an integer, usually below about 15.

This invention involves the further important discovery that it is possible to remove essentially all of the —POX₂ end groups from the oligomer without destroying its usefulness as a monomer from which halophosphazenes of higher molecular weight can be formed. Indeed, by heating at least a stoichiometric amount of a nitrogen source such as ammonium chloride or the like with a halophosphazene of lower molecular weight which has been substantially freed of —POX₂ end groups, it is possible to produce halophosphazene polymers such as phosphonitrilic chloride polymers having less crosslinking that that which would occur if the —POX₂ end groups had not been removed from the initial halophosphazene oligomer. Thus by virtue of the process of this invention halophosphazenes of higher molecular weight with improved properties (e.g., lower gel content) can be readily produced from halophosphazene of lower molecular weight such as phosphonitrilic chloride oligomers. In fact, polymers of desired molecular weights (e.g., average degrees of polymerization in the range of 20 to 1000 or more) with low gel content can be formed in good yield and high purity at relatively moderate temperatures in relatively short reaction periods. And the resultant polymer has enhanced utility because of its greater linearity and reduced gel-forming tendencies.

Thus in accordance with one embodiment of this invention we provide improvements in the processes for producing halophosphazenes described in U.S. Pat. No. 4,374,815, issued Feb. 8, 1983 and in commonly assigned copending applications Ser. No. 447,720, filed Dec. 7, 1982; Ser. No. 487,804, filed Apr. 22, 1983; Ser. No. 4887,805, filed Apr. 22, 1983; and Ser. No. 489,414, filed Apr. 28, 1983. In practicing these improvements halophosphazenes of higher molecular weight are produced from halophosphazenes of lower molecular weight which have been substantially freed of —POX₂ end groups (X being a halogen atom). More specifically, in a process wherein halophosphazene polymer is produced by heating halophosphazene composed at least predominantly of non-cyclic halophosphazene of lower molecular weight with at least a stoichiometric amount of a nitrogen source so that hydrogen halide is evolved and halophosphazene polymer of higher molecular weight is formed, this embodiment of the invention provides the improvement in which the halophosphazene of lower molecular weight is substantially freed of —POX₂ end groupd (X being a halogen atom) before forming the halophosphazene polymer of higher molecular weight.

In another of its embodiments this invention provides a process for removing the —POX₂ end group from an oligomer of the formula:

$$X\text{-}(PX_2=N)_n\text{-}POX_2$$

wherein X is a halogen atom and n is an integer below about 15, said oligomer being in admixture with halophosphazene oligomer devoid of the —POX₂ end group, which process comprises heating the oligomer with a phosphorus pentahalide (or its chemical equivalent such as PX₃+X₂; 2P+5X₂; 2P+PX₃+6X₂; etc.) to a temperature at which the oligomer is essentially freed of the —POX₂ end group.

In still another of its embodiments this invention provides a process for removing the —POX₂ end group from an oligomer of the formula:

$$X\text{-}(PX_2=N)_n\text{-}POX_2$$

wherein X is a halogen atom and n is an integer below about 15, said oligomer being in admixture with halophosphazene oligomer devoid of the —POX₂ end group, which process comprises heating the oligomer with at least one phosphorus compound of the formula:

$$[X\text{-}(PX_2=N)_n\text{-}PX_3]^+[R]^-$$

wherein X is a halogen atom, R is X or PX₆ or both of them, and n is an integer below about 15, to a temperature at which the oligomer is essentially freed of the —POX₂ end group.

It will be noted that manipulatively the process of this invention is the essence of simplicity. All that is required is to heat the oligomer mixture which comprises the components:

$$[X\text{-}(PX_2=N)_n\text{-}PX_3]^+[R]^-$$

and $$X\text{-}(PX_2=N)_n\text{-}POX_2$$

wherein X is a halogen atom, R is X or PX₆ or both of them, and n is an integer, usually below about 15, either with or without the addition of a phosphorus pentahalide to a suitable temperature at which the oligomer mixture is essentially freed of the —POX₂ end group. This renders the resultant oligomer ideally suited for use in the ensuing polymerization step. It will be understood that while the foregoing oligomer mixture may be subjected to some polymerization before freeing the system of the —POX₂ end groups therein, it is preferably to treat the oligomer to remove essentially all of such end groups before the oligomer is heated with the nitrogen source to effect the polymerization.

DETAILED DESCRIPTION

First Stage-Oligomer Treatment

The initial halophosphazene of lower molecular weight employed in the process is composed at least predominantly of oligomer of the formula $$[X\text{-}(PX_2=N)_n\text{-}PX_3]^+[R]^-$$

wherein X is a halogen atom, R is X or $PX_6$ or both of them, and n is an integer below about 15, said halophosphazene of lower molecular weight also initially including oligomer of the formula $$X\text{-}(PX_2=N)_n\text{-}POX_2$$

wherein X and n are as defined above. Preferably X is fluorine or bromine, or a mixture of both of them, or a mixture of either or both of them with chlorine, and most preferably is chlorine.

To free such initial halophosphazene oligomer from the $-POX_2$ end groups, various processes may be used. Pursuant to one preferred embodiment of this invention the halophosphazene of lower molecular weight is heated with phosphorus pentahalide (or the chemical equivalent thereof, viz., $PX_3+X_2$, or $2P+5X_2$, or $PX_3+2P+6X_2$, etc.) whereby the $-POX_2$ end groups are converted into an innocuous end group, viz., the $-PX_3$ group. This transformation apparently proceeds via the equation:

$$X\text{-}(PX_2=N)_n\text{-}POX_2+PX_5\rightarrow[X\text{-}(PX_2=N)_n\text{-}PX_3]^++X^-+POX_3$$

It will be noted that the co-product of this reaction is phosphoryl trihalide, $POX_3$, also known as phosphorus oxytrihalide.

Another preferred embodiment of this invention involves removing the $-POX_2$ end groups from the above-described initial halophosphazene oligomer by heating the halophosphazene of lower molecular weight to a temperature high enough to cause such $-POX_2$ end groups to be transformed in situ to an innocuous end group, believed to be a $-PX_3^+$ end group. Here again phosphoryl trihalide, $POX_3$, is formed concurrently. In this embodiment the reaction is believed to proceed via either or both of the equations:

$$X\text{-}(PX_2=N)_n\text{-}POX_2+[X\text{-}(PX_2=N)_m\text{-}PX_3]^+[R]^-\rightarrow[X\text{-}(PX_2=N)_{n+m}\text{-}PX_3]^+[R]^-+POX_3 \quad (1)$$

$$X\text{-}(PX_2=N)_n\text{-}POX_2+[X\text{-}(PX_2=N)_m\text{-}PX_3]^+[PX_6]^-\rightarrow[X\text{-}(PX_2=N)_n\text{-}PX_3]^++X^-+[X\text{-}(PX_2=N)_m\text{-}PX_3]^++X^-+POX_3 \quad (2)$$

Other treating processes to effect conversion of such $-POX_2$ end groups to useful linear halophosphazene containing $-PX_3$ end groups may now occur to those skilled in the art especially after a perusal of this description and appended claims.

Upon the substantial elimination of the $-POX_2$ end grous from the initial halophosphazene, the resultant halophosphazene of lower molecular weight is composed at least predominantly of oligomer of the formula $$[X\text{-}(PX_2=N)_n\text{-}PX_3]^+[R]^-$$

wherein X is a halogen atom, R is X or $PX_6$ and n is an integer below about 15, and is essentially devoid of $-POX_2$ groups. Such halophosphazene is thereupon heated with at least a stoichiometric amount (preferably, an excess) of a nitrogen source so that hydrogen halide is evolved and halophosphazene polymer of higher molecular weight is formed. It is not necessary to remove the phosphoryl trihalide co-product from the halophosphazene either before or during the polymerization—unlike the $-POX_2$ end group, the $POX_3$ does not materially affect the polymerization.

In accordance with this invention the operation in which the halophosphazene of lower molecular weight is freed of $-POX_2$ end groups is conducted at a suitable elevated temperature, which ordinarily is in the range of between about 120° to about 320° C., and preferably in the range of between about 180° to about 260° C. It will of course be understood that this operation should be conducted in an essentially anhydrous, oxygen-free environment. Thus, the process may be conducted in a dry inert atmosphere such as anhydrous argon, anhydrous nitrogen, or the like. Similarly, the reaction may be conducted under vacuum in a dry environment.

Naturally, the heating operation should be conducted for a period of time long enough for the halophosphazene monomer to be substantially freed of the $-POX_2$ end groups. Periods of up to about 36 hours will ordinarily suffice, periods within the range of about 3 to about 24 hours being preferred. As a general rule higher reaction temperatures will involve use of shorter reaction periods, and vice versa.

The heating operation may be conducted in a suitable closed or open reaction system so long as the system is kept essentially free of air and moisture. The operation may be performed on a batch, semi-continuous, or continuous basis.

The proportions of the reactants used in the oligomer treatment step are not critical, although of course a sufficient amount of the $PX_5$ or $[X\text{-}(PX_2=N)_n\text{-}PX_3]^+[R]^-$ reactant should be present to enable substantially complete conversion of the $-POX_2$ end groups to $-PX_3^+$ end groups.

Second Stage Operation-Polymerization

The next stage of the process involves polymerizing at least a portion of the above-treated reaction product by heating the same with at least a stoichiometric amount (preferably an excess) of a nitrogen source material so that hydrogen halide is evolved. In this way polymerization is caused to take place along with the formation of hydrogen halide. Additionally, cyclic halophosphazene such as cyclic phosphonitrilic chloride oligomer tends to be produced. It is important to remove the hydrogen halide from the reaction mixture, preferably essentially as soon as it is formed. This is accomplished by performing the reaction in an open reaction system, "open" in the sense that the hydrogen halide is able to leave or be carried away from the reaction zone such as by a sweep of inert gas, application of a vacuum, or the like. The process may also be carried out under pressure, provided that the hydrogen halide is continuously or at least periodically bled from the reaction system.

It is also preferred to separate at least a portion of the cyclic phosphonitrilic halide oligomers from the heated reaction mixture during the course of the polymerization reaction. Alternatively, such phosphonitrilic halide oligomers may be separated from the halophosphazene polymer after completion of the polymerization reaction. In either case at least a portion of the recovered cyclic oligomer may be used as feed to the polymerization reaction, for example by recycle or otherwise. Still another alternative involves leaving all or a portion of the cyclic oligomers in the polymerization reaction product from the polymerization reaction and subjecting this mixture with or without addition of another solvent or diluent to the optional, but preferred third stage operation described hereinafter.

To effect separation of cyclic halophosphazene oligomer (e.g., phosphonitrilic chloride oligomer) during the course of the polymerization reaction, use may be made of several different process techniques. For example, all or a portion of the polymerization may be performed in a boiling inert organic liquid whereby the liquid vapors drive off the cyclic oligomer. Another method is to perform all or a portion of the polymerization reaction at a reduced pressure so that at the temperature employed the cyclic oligomer is distilled from the reaction mixture. Still another way of effecting the removal of the cyclic oligomer is to sweep the heated polymerization reaction mixture with an inert vapor or gas either at subatmospheric, atmospheric or super-atmospheric pressures. In this way the entrained cyclic oligomer is carried away from the polymerization reaction zone during the course of the reaction. In all such cases it is desirable that the polymerization reaction mixture be suitably agitated both during the reaction and during the removal of the cyclic oligomer.

Instead of removing the cyclic oligomers during the course of the polymerization reaction, the cyclic oligomers may be separated from the halophophazene polymer after completion of the polymerization. While various methods may be used for effecting this separation, it is preferable to extract the polymeric reaction product formed in the polymerization reaction with a suitable inert solvent such as hexane or the like.

The polymerization process may be performed in the presence or absence of an inert organic liquid as diluent. In most cases it is preferable to conduct all or a portion of the polymerization in bulk (i.e., in the substantial absence of added reaction solvent or diluent) as this reduces the size requirements for the polymerization reaction vessels.

When employing solvents in the polymerization, use may be made of such materials as saturated cycloaliphatic hydrocarbons (e.g., cyclohexane, methylcyclohexane, 1,2-dimethylcyclohexane, etc.), aromatic hydrocarbons (e.g, toluene, xylenes, trimethylbenzenes, ethylbenzene, methylnaphthalenes, etc.), chlorinated hydrocarbons (e.g., 1,4-dichlorobutane, tetrachloroethane, chlorobenzene, dichlorobenzenes, etc.), and other similar inert solvents.

A wide variety of nitrogen source materials may be used in the polymerization of the process. For example, use may be made of ammonia, ammonium chloride, ammonium fluoride, ammonium bromide, ammonium iodide, and the like. Use of ammonia or ammonium chloride (or both) is preferred.

When employing ammonium halide or like particulate materials as the nitrogen source material in the polymerization reaction, the reaction time of this polymerization reaction can be significantly reduced by reducing the particle size of the ammonium halide used. For example, conversion of the first-stage reaction product to linear polymer using ammonium chloride having a relatively small mean particle size of about 86 microns may be completed at a temperature of about 160° C. after about one hour. On the other hand, when ammonium chloride having a relatively large mean particle size of about 115 microns is used, the polymerization rate at the same reaction temperature is slower and the yield of desired polymeric product is lower. The mean particle size of the ammonium chloride is preferably within the range of about 1 micron to about 100 microns and most preferably within the range of about 1 micron to about 90 microns.

Additionally it is preferred that the ammonium halide be further characterized by satisfying additional particle size parameters. Such parameters may be represented by the following designations:

PH, which stands for 10 volume % of particles greater than the value of the microns stated PM, which stands for 50 volume % of particles greater than the value of the microns stated PS, which stands for 90 volume % of particles greater than the value of the microns stated.

For example, a PH of 145 microns, a PM of 83.8 microns and a PS of 37.4 microns means that the sample contains 10 volume % of particles greater than 145 microns, 50 volume % greater than 83.8 microns and 90 volume % greater than 37.4 microns, respectively.

Thus in accordance with these further preferred embodiments the ammonium halide (preferably ammonium chloride) employed has in addition to the foregoing Mean Values a PH below about 180 microns and most preferably below about 160 microns, a PM below about 90 microns and most preferably below about 85 microns, and a PS below about 45 microns and most preferably below about 40 microns.

Ammonium chloride having a relatively small particle size may be prepared, for example, by reacting hydrogen chloride gas with ammonia gas. If the ammonium chloride is formed and used in situ without first isolating the ammonium chloride, the particle size will have a Mean Value less than about 86 microns—i.e., a Mean Value as low as about 5 microns.

As noted above, at least a stoichiometric amount (preferably an excess) of the nitrogen source material is employed in the polymerization of the process. Accordingly, the quantities in which the nitrogen source material is used are not critical provided that a sufficient amount is introduced into the reaction mixture to provide at least the stoichiometric amount relative to the quantity of halophosphazene product being reacted. The entire amount of the nitrogen source material being used in the reaction may be charged into the reaction vessel at the start of the reaction. However, in order to control the reaction the nitrogen source material may be introduced into the reaction mixture either periodically on an incremental basis or on a continuous basis during the course of all or a portion of the polymerization.

The polymerization is conducted at a temperature sufficiently high to cause the formation of hydrogen halide. Therefore, the temperatures employed will usually fall within the range of from about 100° C. to about 350° C. Preferably, the average temperature employed in the polymerization will fall within the range of from about 120° C. to about 280° C.

The oligomer treatment operation and the polymerization may be conducted on a more or less continual basis simply by introducing the nitrogen source material at the proper time to the reaction mixture from the oligomer treatment stage.

Once the polymerization reaction has been completed, the polymeric product may be recovered and purified by conventional procedures such as solvent extraction and the like.

Third Stage Treatment

In a particularly preferred embodiment, the product from the polymerization is subjected to further processing in order to still further increase the molecular weight of the halophosphazene polymer. This optional but highly preferred third stage treatment is carried out by heating the resultant reaction mixture, preferably in an inert liquid solvent, at a suitably elevated temperature which on the average is usually (but not necessarily) higher than the average temperature employed in the prior polymerization reaction, optionally in the presence of nitrogen source material of the type described above, preferably ammonia or ammonium chloride. The third stage is conducted for a time period sufficient to increase the molecular weight of the halophosphazene polymer. When ammonium chloride or like particulate nitrogen source material is used in the third stage, preferably it has a relatively small particle size as discussed above.

In the third stage as in the prior polymerization process, a temperature high enough to cause the formation of hydrogen halide is employed. Thus, the third stage temperatures will generally fall within the range of from about 100° C. to about 350° C., and preferably the average temperature in the third stage will fall within the range of from about 120° C. to about 280° C. In one embodiment of this invention, a higher temperature is used in the third stage than in the prior polymerization step. The "higher temperature" used in the third stage is an average temperature that preferably is at least five and most preferably at least ten Centigrade degrees higher than the average temperature used in the prior polymerization step.

As in the case of the prior polymerization, the third stage reaction should be performed so that hydrogen halide formed in the reaction is removed from the reaction system. This may be accomplished by performing the reaction in an open reaction system, "open" in the sense that the hydrogen halide is able to leave or be carried away from the reaction zone such as by a sweep of inert gas, application of a vacuum, or the like. The third stage processing may also be carried out under pressure, provided that the hydrogen halide is continuously or at least periodically bled from the reaction system.

Generally speaking, the longer the reaction time in the third stage, the higher the molecular weight of the resultant halophosphazene polymer. Accordingly, the reaction time for this reaction will depend to some extent on the desired molecular weight of the polymer and may be varied within relatively wide limits although ordinarily times in the range of about 1 to about 36 and preferably from about 4 to about 24 hours will usually be used. At least a portion of the third stage may be performed in the presence of a nitrogen source material of the type used in the polymerization such as ammonia or ammonium chloride, or the like and such material(s) may be introduced into the reaction mixture at the start and/or during the course of the reaction. Alternatively, such material(s) may constitute residual nitrogen source materials remaining in the reaction mixture after completion of the prior polymerization reaction.

A wide variety of inert solvents may be employed in the third stage. These include inert chloroaliphatic, cycloaliphatic, and aromatic solvents of various types, including mixtures of solvents. While various cycloalkanes, chloroalkanes and chlorocycloalkanes having appropriate boiling points are thus suitable for this operation, it is preferred to use an inert aromatic solvent such as aromatic hydrocarbons and chloroaromatic hydrocarbons having boiling points at least as high as the reaction temperature being used in the polymerization. Preferred solvents of this type include toluene, xylenes, methylnaphthalenes, chlorobenzene, dichlorobenzenes, trichlorobenzenes, etc., as well as mixtures of such materials. The third stage preferably is conducted at elevated pressures with the hydrogen halide formed in the reaction being bled from the reaction system either continuously or at least periodically.

If desired, the second (polymer forming) and third (molecular weight increasing) stages of the process may both be performed in the same solvent or mixtures of solvents.

The amount of solvent used in the third stage is preferably regulated so as to keep the reaction mixture in a relatively concentrated solution while avoiding excessive gelation. Thus it is desirable to perform the third stage in a relatively concentrated reaction solution with periodic or continuous addition of solvent to maintain the reaction mixture in a fluid state as the reaction proceeds.

If it is desired to recover the linear phosphonitrilic chloride polymeric product from the reaction solvent used in the third stage, various techniques are available for use. For example, the solvent may be distilled off using an appropriate combination of reduced pressure and distillation temperature. Alternatively, the halophosphazene polymer may be precipitated from the solvent by the addition of the solution to a suitable non-solvent such as pentane or hexane. These and other similar techniques will be evident to those skilled in the art.

When it is desired to chemically convert the halophosphazene polymer into another type of phosphazene polymer, subsequent reactions with an appropriate reactant may be effected in the same reaction solvent as used in the third stage (or in the prior polymerization, if a solvent is used therein). Indeed, in such cases it is unnecessary to isolate or recover the halophosphazene polymer formed in the second or third stages as the ensuing reaction(s) may be effected in the same solution. Alternatively, such subsequent reactions may be effected in a fresh solution and, if desired, in a different inert solvent.

In accordance with a preferred embodiment, the reaction mixture from the third stage reaction is extracted with a suitable inert solvent such as pentane, hexane or heptane in order to separate and recover the cyclic oligomers present in the reaction mixture. All or a portion of these recovered cyclic oligomers may be used in the second and/or third stage of the process.

The second and third stages may be conducted in separate reactors. A feature of this invention, however, is the fact that both stages may be performed in the same reaction vessel, provided of course that it is appropriately sized to handle the quantities of material involved in each stage. Thus in accordance with a preferred embodiment of this invention, both stages are conducted in the same reactor. It is further preferred to conduct the initial polymerization reaction in bulk and to introduce a solvent for the third stage into such reactor upon or near the completion of the initial polymerization stage but otherwise perform the second and third stages as a more or less continual operation. Both of these stages (as well as the first stage—i.e., the oligomer treatment operation) may be conducted in the presence of a solvent, if desired.

The foregoing and other procedures and process conditions for effecting polymer formation are fully set forth in U.S. Pat. No. 4,374,815, issued Feb. 22, 1983 and in co-pending applications Ser. No. 447,720, filed Dec. 7, 1982, Ser. No. 487,804, filed Apr. 22, 1983, Ser. No. 487,805, filed Apr. 22, 1983, and Ser. No. 489,414, filed Apr. 28, 1983, all assigned to the assignee of the present application. The disclosures of U.S. Pat. No. 4,374,815 and these commonly assigned applications are incorporated herein by reference.

The practice of this invention will become still further apparent from the following illustrative examples which are not to be construed in a limiting sense.

Examples I and II illustrate procedures by which the first stage (oligomer treatment) of the process may be carried out.

EXAMPLE 1

A 4.3 g portion of Cl-$(PCl_2=N)_n$-$POCl_2$ oligomer, prepared from phosphorus pentachloride ($PCl_5$) and ammonium sulfate [$(NH_4)_2SO_4$] by the procedure reported by Emsley et al. in *Journal of The Chemical Society*, Part A, 1971, at pages 2863 & 2864, and having an average degree of polymerization of 1.3, was combined in a glass ampoule with 3.3 g of $PCl_5$. The sample was degassed via standard vacuum line freeze-thaw techniques and the ampoule sealed off with a torch. The ampoule was then affixed to a rocking device and submerged in a thermostated oil bath at 220° C. for 24 hours. After 24 hours the ampoule was removed, opened in a nitrogen filled dry-box and sampled for $^{31}P$ NMR analysis. The analysis showed the products to be [Cl-$(PCl_2=N)_n$-$PCl_3$]$^+$[$PCl_6$]$^-$ oligomer with an average degree of polymerization of 2.27 and phosphorus oxychloride ($POCl_3$). There was no evidence of any residual Cl-$(PCl_2=N)_n$-$POCl_2$ type reactant.

EXAMPLE II

Into a glass ampoule was placed a sample of linear phosphazene oligomer, [Cl-$(PCl_2=N)_n$-$PCl_3$]$^+$[R]$^-$ (where R was 72 mole % $PCl_6$ and 28 mole % Cl), having an average degree of polymerization (n above) of 4.9 and contaminated with —$POCl_2$ end groups. The sample was degassed via standard freeze-thaw vacuum line techniques and the ampoule sealed off with a torch. The ampoule was then affixed to a rocking device and submerged in a thermostated oil bath at 220° C. for 24 hours. After 24 hours the ampoule was removed, opened in a nitrogen filled dry-box and sampled for $^{31}P$ NMR analysis. The results are presented in the table below.

|  | Phosphorus Mole % | |
| --- | --- | --- |
|  | Before Heating | After 24 hrs at 220° C. |
| —$POCl_2$ | 3.6 | 0.4 |
| $POCl_3$ | 0.4 | 2.9 |

As the data show, the level of —$POCl_2$ groups was reduced from 3.6 mole % of the total phosphorus to 0.4 mole %. There was a concomitant increase in the amount of phosphorus oxychloride ($POCl_3$).

Comparative Example III is a typical illustration of the difficulties one experiences when attempting to practice the second stage of the process on phosphazene containing —$POCl_2$ end groups.

COMPARATIVE EXAMPLE III

Into a 500 mL four-neck creased flask fitted with a mechanical stirrer, gas inlet and outlet and a thermometer were placed 194.6 g of the same oligomer used in Example II and 22.5 g of ammonium chloride. The contents of the flask were heated to 140° C. and the evolved hydrogen chloride and cyclic phosphazenes were swept from the head space by nitrogen gas. After seven hours no visible thickening (evidence of polymerization) had occurred. At this time the heat was removed and the reaction mass was allowed to stand overnight under nitrogen gas. The next morning the heat was reapplied and the temperature raised to 160° C. After forty minutes the fluid reaction mass gelled suddenly to give an insoluble mass.

Examples IV and V are typical illustrations of the successful practice of the second and third stages, respectively, of the process on phosphazene which is essentially free of species containing —$POCl_2$ end groups.

EXAMPLE IV

Using an apparatus similar to that described in Comparative Example III, 744 g of a linear phosphazene oligomer [Cl-$(PCl_2=N)_n$-$PCl_3$]$^+$[R]$^-$ (R=99.6 mole % $PCl_6$ and 0.4 mole % Cl) having an average degree of polymerization (n above) of 4.5 and being free of —$POCl_2$ end groups (as evidenced by $^{31}P$ NMR) was heated with 97 g of ammonium chloride at about 140° C. for two hours and then at about 165° C. for five hours while sweeping with nitrogen gas. At this time the reaction mixture had thickened considerably. The viscosity of the reaction mass was found to be 2430 cPs at 100° C.

EXAMPLE V

Into a two-liter pressure reactor were charged 100.0 g of the reaction mixture from Example IV, 3.5 g of ammonium chloride and 906 g of chlorobenzene. The oil jacket of the reactor was heated to 180° C. while the contents were stirred at 70 rpm by means of an anchor and a turbine agitator. The pressure was held at 24 psig while the head space was swept with nitrogen gas at a rate of 0.1 cubic foot per hour. After twenty-three hours a gel-free phosphonitrilic chloride polymer having an intrinsic viscosity in chlorobenzene at 25° C. of 0.68 was obtained.

The linear phosphonitrilic chloride polymers produced in accordance with this invention are useful for a variety of applications. By way of example these linear polymers when of relatively low molecular weight are useful as intermediates in the synthesis of hydraulic fluids, lubricants and flame retardants. In particular the linear phosphonitrilic chloride polymers preferably having average degrees of polymerization below about 50 may be substituted with aryloxy and/or alkoxy groups to form products useful as hydraulic fluids, lubricants and flame retardants. Methods for effecting such substitution are well known in the art and are described for example in U.S. Pat. Nos. 3,443,913; 3,856,712; 3,883,451; and 4,055,523. Alternatively, aryloxy and alkoxy substituted linear polymers of higher average degrees of polymerization containing ethylenic unsaturation can be compounded and cured by crosslinking to produce elastomers, coatings, adhesives, potting compounds, thermoset plastics and flexible or rigid foams. Note in this connection U.S. Pat. No. 4,264,531. Still other users for the linear phosphonitrilic chloride polymers producible by the process of this invention will be apparent to those skilled in the art and are reported in the literature.

We claim:

1. In a process wherein halophosphazene polymer is produced by heating halophosphazene composed at least predominantly of linear halophosphazene of lower molecular weight with at least a stoichiometric amount of a nitrogen source so that hydrogen halide is evolved and halophosphazene polymer of higher molecular weight is formed, the improvement in which the halophosphazene of lower molecular weight is substantially freed of —$POX_2$ end groups (X being a halogen atom) before forming the halophosphazene polymer of higher molecular weight.

2. The process of claim 1 wherein the halophosphazene of lower molecular weight is composed at least predominantly of oligomer of the formula $$[X\text{-}(PX_2=N)_n\text{-}PX_3]^+[R]^-$$

wherein X is a halogen atom, R is X or $PX_6$ or both of them, and n is an integer below about 15, said halophosphazene of lower molecular weight also including oligomer of the formula $$X\text{-}(PX_2=N)_n\text{-}POX_2$$

wherein X and n are as defined above.

3. In a process wherein halophosphazene polymer is produced by heating halophosphazene composed at least predominantly of linear halophosphazene of lower molecular weight with at least a stoichiometric amount of a nitrogen source so that hydrogen halide is evolved and halophosphazene polymer of higher molecular weight is formed, the improvement in which the halophosphazene of lower molecular weight is treated to remove —$POX_2$ end groups (X being a halogen atom) before forming the halophosphazene polymer of higher molecular weight.

4. The process of claim 3 wherein the halophosphazene of lower molecular weight is composed at least predominantly of oligomer of the formula $$[X\text{-}(PX_2=N)_n\text{-}PX_3]^+[R]^-$$

wherein X is a halogen atom, R is X or $PX_6$ or both of them, and n is an integer below about 15, said halophosphazene of lower molecular weight also including oligomer of the formula $$X\text{-}(PX_2=N)_n\text{-}POX_2$$

wherein X and n are as defined above.

5. The process of claim 3 wherein the treatment to remove the —$POX_2$ end groups comprises heating the halophosphazene of lower molecular weight with phosphorus pentahalide.

6. The process of claim 3 wherein the treatment to remove the —$POX_2$ end groups comprises heating the halophosphazene of lower molecular weight to a temperature high enough to cause such —$POX_2$ end groups to be transformed in situ to the —$PX_3^+$ end group.

7. In a process wherein chlorophosphazene polymer is produced by heating chlorophosphazene composed at least predominantly of linear chlorophosphazene of lower molecular weight with at least a stoichiometric amount of a nitrogen source so that hydrogen chloride is evolved and chlorophosphazene polymer of higher molecular weight is formed, the improvement in which the chlorophosphazene of lower molecular weight is substantially freed of —$POCl_2$ end groups before forming the chlorophosphazene polymer of higher molecular weight.

8. The process of claim 7 wherein the chlorophosphazene of lower molecular weight is composed at least predominantly of oligomer of the formula $$[Cl\text{-}(PCl_2=N)_n\text{-}PCl_3]^+[R]^-$$

wherein R is Cl or $PCl_6$ or both of them, and n is an integer below about 15, said chlorophosphazene of lower molecular weight also including oligomer of the formula $$Cl\text{-}(PCl_2=N)_n\text{-}POCl_2$$

wherein n is as defined above.

9. The process of claim 8 wherein R is at least predominantly $PCl_6$.

10. In a process wherein chlorophosphazene polymer is produced by heating chlorophosphazene composed at least predominantly of linear chlorophosphazene of lower molecular weight with at least a stoichiometric amount of a nitrogen source so that hydrogen chloride is evolved and chlorophosphazene polymer of higher molecular weight is formed, the improvement in which the chlorophosphazene of lower molecular weight is treated to remove —$POCl_2$ end groups before forming the chlorophosphazene polymer of higher molecular weight.

11. The process of claim 10 wherein the chlorophosphazene of lower molecular weight is composed at least predominantly of oligomer of the formula $$[Cl\text{-}(PCl_2=N)_n\text{-}PCl_3]^+[R]^-$$

wherein R is Cl or $PCl_6$ or both of them, and n is an integer below about 15, said chlorophosphazene of lower molecular weight also including oligomer of the formula $$Cl\text{-}(PCl_2=N)_n\text{-}POCl_2$$

wherein n is as defined above.

12. The process of claim 11 wherein R is at least predominantly $PCl_6$.

13. The process of claim 12 wherein the treatment to remove the —$POCl_2$ end groups comprises heating the chlorophosphazene of lower molecular weight with phosphorus pentachloride.

14. The process of claim 12 wherein the treatment to remove the —$POCl_2$ end groups comprises heating the chlorophosphazene of lower molecular weight to a temperature high enough to cause such —$POCl_2$ end groups to be transformed in situ to the —$PX_3^+$ end group.

15. A process for removing the —$POX_2$ end group from an oligomer of the formula:

$$X\text{-}(PX_2=N)_n\text{-}POX_2$$

wherein X is a halogen atom and n is an integer below about 15 which comprises heating the oligomer with a phosphorus pentahalide to a temperature at which the oligomer is essentially freed of the —POX$_2$ end group.

16. The process of claim 15 wherein X is a chlorine atom.

17. A process for removing the —POX$_2$ end group from an oligomer of the formula:

X-(PX$_2$=N)$_n$-POX$_2$ wherein X is a halogen atom and n is an integer below about 15 which comprises heating the oligomer with at least one phosphorus compound of the formula:

[X-(PX$_2$=N)$_n$-PX$_3$]$^+$[R]$^-$ wherein X is a halogen atom, R is X or PX$_6$ or both of them, and n is an integer below about 15, to a temperature at which the oligomer is essentially freed of the —POX$_2$ end group.

18. The process of claim 17 wherein X is a chlorine atom.

* * * * *

UNITED STATES PATENT AND TRADEMARK OFFICE
CERTIFICATE OF CORRECTION

PATENT NO.   :   4,522,798

DATED        :   JUNE 11, 1985

INVENTOR(S)  :   GENEVIEVE S. LUM, ET AL.

It is certified that error appears in the above-identified patent and that said Letters Patent is hereby corrected as shown below:

Column 5, line 65, reads "4887,805" and should read -- 487,805 --.

Signed and Sealed this

Twenty-second Day of October 1985

[SEAL]

Attest:

Attesting Officer

DONALD J. QUIGG

Commissioner of Patents and Trademarks—Designate